(12) United States Patent
Brunner et al.

(10) Patent No.: US 8,586,667 B2
(45) Date of Patent: Nov. 19, 2013

(54) OXIDATION RESISTANT HIGHLY-CROSSLINKED UHMWPE

(75) Inventors: Lorenz Brunner, Zurich (CH); Yvo Dirix, Erlenbach (CH); Hans Schmotzer, Zurich (CH)

(73) Assignee: Smith & Nephew Orthopaedics AG, Rotkreuz (CH)

( * ) Notice: Subject to any disclaimer, the term of this patent is extended or adjusted under 35 U.S.C. 154(b) by 93 days.

(21) Appl. No.: 12/992,595

(22) PCT Filed: May 13, 2008

(86) PCT No.: PCT/EP2008/003834
§ 371 (c)(1),
(2), (4) Date: Feb. 7, 2011

(87) PCT Pub. No.: WO2009/138103
PCT Pub. Date: Nov. 19, 2009

(65) Prior Publication Data
US 2011/0116968 A1    May 19, 2011

(51) Int. Cl.
C08L 23/06 (2006.01)
C08G 18/08 (2006.01)

(52) U.S. Cl.
USPC .................................. 524/587; 523/300

(58) Field of Classification Search
USPC ....... 523/300; 424/423; 524/9, 587; 514/458; 623/23.58
See application file for complete search history.

(56) References Cited

U.S. PATENT DOCUMENTS

| | | | |
|---|---|---|---|
| 5,414,049 A | 5/1995 | Sun et al. | |
| 5,827,904 A | 10/1998 | Hahn | |
| 5,879,400 A | 3/1999 | Merrill et al. | |
| 6,228,900 B1 | 5/2001 | Shen et al. | |
| 6,277,390 B1 | 8/2001 | Schaffner | |
| 6,448,315 B1 | 9/2002 | Lidgren et al. | |
| 6,818,172 B2 * | 11/2004 | King et al. | 264/479 |
| 7,431,874 B2 * | 10/2008 | Muratoglu et al. | 264/259 |
| 2007/0059334 A1 * | 3/2007 | Abt et al. | 424/423 |
| 2007/0213834 A1 * | 9/2007 | Kunze et al. | 623/23.58 |
| 2008/0319137 A1 | 12/2008 | Rufner | |
| 2010/0082101 A1 | 4/2010 | Muratoglu | |
| 2010/0144930 A1 | 6/2010 | Dirix | |

FOREIGN PATENT DOCUMENTS

| | | |
|---|---|---|
| CA | 256129 A | 12/1925 |
| CN | 101687942 A | 3/2010 |
| EP | 0722973 A1 | 7/1996 |
| EP | 0 995 449 A1 | 4/2000 |
| JP | 11239611 A | 9/1999 |
| JP | 2001-212837 | 8/2001 |
| JP | 2009-504897 | 2/2009 |
| JP | 2010-521566 | 6/2010 |
| JP | 2010-523805 | 7/2010 |
| WO | 01/80778 A1 | 11/2001 |
| WO | 2004064618 A2 | 8/2004 |
| WO | 2005/074619 A2 | 8/2005 |
| WO | WO 2005/074619 | 8/2005 |
| WO | 2005110276 A1 | 11/2005 |
| WO | WO 2007/019874 | 2/2007 |
| WO | 2007/024684 A2 | 3/2007 |
| WO | 2008/113388 A1 | 9/2008 |
| WO | WO 2008/113388 A1 | 9/2008 |

OTHER PUBLICATIONS

Chinese First Office Action issued in Chinese Application No. 200880130343.2, mailed Jan. 6, 2012, 4 pages.
E. Oral, et al., "Characterization of irradiated blends of alpha-tocopherol and UHMWPE," Biomaterials 26 (2005), Elsevier Science Publishers BV, Barking, GB; vol. 26, No. 33, Nov. 1, 2005, pp. 6657-6663, XP004989123, 7 pages.
International Search Report issued in PCT/EP2008/003834, mailed on Feb. 19, 2009, 3 pages.
Office Action dated May 4, 2011, received in corresponding European application No. 08 758 493.4 (4 pages).
Chinese Second Office Action issued in Chinese Application No. 200880130343.2, mailed Nov. 26, 2012, 4 pages.
Japanese First Office Action issued in Japanese Application No. 2011-508796, mailed Feb. 5, 2013, 7 pages.
European Examination Report issued in European Patent Application No. 08 758 493.4, mailed Aug. 20, 2012, 3 pages.

* cited by examiner

*Primary Examiner* — Hannah Pak
(74) *Attorney, Agent, or Firm* — Krieg DeVault LLP

(57) ABSTRACT

The present invention relates to highly cross-linked UHMWPE, which is possessed of an improved oxidation resistance, as well as a method for making the same. The UHMWPE material of the current invention is combined with an anti-oxidant compound or a free-radical scavenger prior to formation. Once the UHMWPE with the added material has been formed and treated with gamma or electron bean irradiation, it shows an improved wear resistance and also a good resistance to oxidation. Such a material, is particularly interesting for the field of making replacement joint implants.

19 Claims, No Drawings

OXIDATION RESISTANT HIGHLY-CROSSLINKED UHMWPE

CROSS-REFERENCE TO RELATED APPLICATIONS

This application is a United States patent application filed under 35 U.S.C. §371 as a US National Phase application from Patent Cooperation Treaty ("PCT) International Application Number PCT/EP2008/003834, International Filing Date 13 May 2008 (May 13, 2008; May 13, 2008) and PCT International Filing Date of 13 May 2008 (May 13, 2008; May 13, 2008), which is hereby incorporated herein by reference in its entirety.

BACKGROUND OF THE INVENTION

Ultra-high molecular weight polyethylene (UHMWPE) is the most commonly used bearing material in total joint replacements and was introduced by John Charnley in the early 1960s (The UHMWPE Handbook, edited S. Kurtz, Elsevier, 2004). Since then, a wide variety of applications have been developed in the total joint arthroplasty, as a result of the material's high toughness and good mechanical properties. Although "conventional" UHMWPE has an excellent clinical record, the maximum lifetime of implant systems is restricted due to the wear particles released from the UHM-WPE bearing surface (Willert H. G., Bertram H., Buchhorn G. H., Clin Orthop 258, 95, 1990). These wear particles can induce an osteolytic response in the human body leading to local bone resorption and eventually to aseptic loosening of the artificial joint. A second problem associated with conventional, gamma-sterilized UHMWPE, is the oxidative degradation that occurs during shelf ageing. The energy of the gamma rays is sufficient to break some of the carbon-carbon or carbon-hydrogen bonds of the polyethylene chains resulting in the formation of free radicals. These radicals partially recombine but some of them are long-living and can react with oxygen present in, or diffusing into, packaging surrounding the implant (Costa L., Jacobson K., Bracco P., Brach del Prever. E. M., Biomaterials 23, 1613, 2002). The oxidative degradation reactions lead to embrittlement of the material and therewith reduce the mechanical properties of the material and might lead to fracture of the implant (Kurtz S. M., Hozack W., Marcolongo M., Turner J., Rimnac C., Edidin A., J Arthroplasty 18, 68-78, 2003).

In the 1970s, highly crosslinked UHMWPEs have been introduced with the intention of improving the wear resistance of the material (Oonishi H., Kadoya Y., Masuda S., Journal of Biomedical Materials Research, 58, 167, 2001; Grobbelaar C. J., du Plessis T. A., Marais F., The Journal of Bone and Joint Surgery, 60-B, 370, 1978). The UHMWPE materials were gamma irradiated at high doses (up to 100 Mrad, this in contrast to gamma sterilization at ~2.5 Mrad) to promote the crosslinking process in the material and thereby increase the wear resistance. The free radical amount on the polyethylene chains is not or only locally reduced, however, and therefore these materials are prone to oxidative degradation during shelf ageing or in-vivo use.

More recently, the irradiation crosslinking processes have been extended by a thermal treatment to reduce or eliminate the number of free radicals. These processes can be subdivided into three groups:

Irradiation below the melting temperature followed by annealing below the melting temperature (U.S. Pat. No. 5,414,049, EP0722973). The main disadvantage of this route is the fact that the UHMWPE chains still contain residual free radicals which lead to oxidative degradation (Wannomae K. K., Bhattacharyya S., Freiberg A., Estok D., Harris W. H., Muratoglu Arthroplasty, 21, 1005, 2006).

Irradiation below the melting temperature followed by remelting above the melting temperature (U.S. Pat. No. 6,228,900). The main disadvantage of this processing scheme is that compared with the annealing process, the mechanical properties are reduced by the remelting step (Ries M. D., Pruitt L., Clinical Orthopaedics and Related Research, 440, 149, 2005).

Irradiation in the melt (U.S. Pat. No. 5,879,400, Dijkstra D. J., PhD Thesis, University of Groningen, 1988). The disadvantage of this process is that the crystallinity is substantially reduced and therewith the mechanical performance.

As a next step, chemical antioxidants have been introduced into medical grade UHMWPE to obtain a wear resistant material that combines a good oxidative stability with sufficient mechanical properties. Most of the common antioxidants exhibit reduced or no biocompatibility, and therefore chemical substances already existing in the human body or in nutritional products were sought. In 1982, Dolezel and Adamirova described a procedure to increase the stability of polyolefins for medical implants against biological degradation in living organisms (CZ 221404). They added alpha-, beta-, gamma- or delta-tocopherol (vitamin E), or a mixture thereof, to polyethylene resin and subsequently processed the resulting mixtures. Besides vitamin E, another class of biologically harmless substances was introduced as oxidation stabilizers in polyethylenes: Hahn described the doping of UHMWPE with carotenoids (e.g. β-carotene) to produce stable and oxidation resistant medical implants (U.S. Pat. No. 5,827,904). However, the wear and oxidation properties of irradiation crosslinked, β-carotene containing products have not been investigated to date.

Recently, several groups established different processing procedures and combined the addition of vitamin E with a radiation crosslinking step to improve the wear resistance of the material (WO 2005/074619). Several investigators added the vitamin E prior to the consolidation of the UHMWPE powder (JP 11239611, U.S. Pat. Nos. 6,277,390, 6,448,315, WO0180778); others diffused the liquid vitamin E into machined products, occasionally with the aid of elevated temperatures (CA 256129, WO 2004064618, WO 2005110276).

Disadvantages of the first of these techniques is the production of a material with lower crosslink density (leading to products with reduced wear resistance) compared with non-stabilized UHMWPE, due to the radical-absorbing properties of the added vitamin E during the actual crosslinking process. Another disadvantage of the processes in WO0180778 is the fact that the implant is machined from a preform that contains vitamin E, this implant is packaged and subsequently irradiated at relatively high doses (>4 Mrad) which will lead to an increased density of the implant and therefore negatively effect the dimensional stability of the implant. Furthermore, the packaging material is exposed to higher irradiation doses which might decrease the long-term mechanical or barrier properties of the packaging. More preferably, the preformed block or rod is irradiated at higher doses and subsequently the implant is machined with high precision from that material and finally packaged. Moreover, the fabrication of homogeneous products with UHMWPE powder and the liquid, highly viscous vitamin E remains challenging.

The second technique also comprises several drawbacks: Due to the diffusion-controlled doping of UHMWPE products, the depth of the vitamin E level remains uncontrolled, inhomogeneous and limited in its spatial dimensions. Although annealing steps after the actual doping process (which is also carried out at elevated temperatures) partially solve the problem of concentration gradients, the final amount of vitamin E in finished products remains unknown.

Stabilization of polyolefins is not restricted to artificial joint applications. Applications could also be in other medical devices like syringes, blood bags, drug vials, medical packagings and the such. But also food contact applications like food packagings, plastic dishes or agricultural and nutritional applications like green houses, liners for food containers and other consumer durables are possible. Even other applications like tubings, fibers, monofilaments or products for the textile industry, but also applications in the building, automotive or electrical industry contain different stabilizers. In these products, polyolefins such as high density polyethylene (HDPE), low density polyethylene (LDPE), linear low density polyethylene (LLDPE) and polypropylene are widely used and are stabilized using butylated hydroxytolene (BHT), Irganox 1010, Irganox B 215 or the such. These additives prevent the polymer system from aging due to e.g. UV or visible light, chemical, physical, mechanical or thermal degradation or other environmental influences such as moisture. For these applications, the polyolefins containing the additives are not necessarily subjected to a gamma or e-beam crosslinking step, also non-crosslinked additive containing materials might be used. For other applications it could be useful though to crosslink the polyolefin containing the natural antioxidants. Examples of such applications are tubes demanding an improved thermal stability or heat shrinkable tubes. Of course, many other applications are possible.

SUMMARY OF THE INVENTION

Given the above-mentioned problems relating to UHMWPE materials with increased crosslinking, it is an objective of the current invention to provide an improved highly crosslinked UHMPWE material, which does not suffer from the increased oxidation properties normally associated therewith. The method of forming the above material is given according to claim 1, and leads to a highly crosslinked material comprising a homogeneous mixture of UHMWPE and an additive material, as is discussed in claim 21. In particular, the method produces a material with a reduced oxidation index after artificial ageing, when compared with that of a normal gamma-sterilized UHMWPE standard material. Such a gamma-sterilized standard UHMWPE material, is one typically used in the medical field for the replacement of joints in implant operations.

The method of claim 1 comprises the steps of combining a quantity of an additive material, typically an antioxidant or a radical scavenger, with a UHMWPE powder. Such a combination is then moulded to create a preform by applying a temperature above the melting point of the UHMWPE powder. Upon formation of the preform material, it is irradiated with either gamma or electron beam radiation at a dose of between 2 and 20 Mrad. Such an irradiation will lead to an increase in the number of crosslinks between the polymers of the UHMWPE material, which will then lead to an increased wear resistance of the end product. By virtue of the additive material included with the UHMWPE powder prior to moulding, the material formed by this process will have an oxidation index which is the same or lower than that of the gamma-sterilized standard UHMWPE material.

Preferably, the method does not comprise the step of heating the irradiated preform material in order to improve the oxidation index, rather it relies on the presence of the additive material.

In the past, some of the chemically synthesized antioxidants have raised concerns regarding their influence on the human metabolism. Some of these substances were linked with cancer or other diseases and some synthetically produced substances recently were related to changes in the human hormone system. Therefore, especially for medical devices or food contact applications but also for all other applications, natural antioxidants are preferred to substances that are synthesized in a lab. Other chemically synthesized additives are, due to the above mentioned problems, not even allowed for human or food contact applications.

DESCRIPTION

The method of production of the UHMWPE material of the current invention, follows closely the standard method for producing a preform of UHMWPE. The term "preform" is used throughout the current specification to mean a consolidated block, sheet or rod of the UHMWPE material, and in particular one which may then be subjected to further processing and finally from which an end product can be obtained. Obtaining the end product from a preform is done by any of the known standard methods, and most typically is accomplished by removing or machining the unwanted parts of the preform to give the final shaped product. As such, the term preform is intended to encompass any of a wide variety of general forms of the consolidated UHMWPE material, and is perhaps best considered as a simple rectangular block. This preform can be subjected to a stress-relief annealing process as it is mentioned in the ISO 5834-2 Standard.

The formation of the UHMWPE material according to the present invention, begins with mixing a desired quantity of an additive material with the UHMWPE powder. In the examples described hereafter, the UHMWPE powder will be of Ticona GUR® 1020 medical grade UHMWPE. Such powder is well known and can be commercially obtained. Of course, also any other UHMWPE powders can be used (For example Ticona GUR® 1050, DSM UH210, Basell 1900, UHMWPE powders with a high purity). Beside UHMWPE, also other polyolefins such as HDPE, LDPE, LLDPE or polypropylene, but also other polymers such as polyvinylchloride (PVC), polystyrene (PS), polyesters like polyethyleneterephthalate (PET), polycarbonate (PC) or polymethylmethacrylate (PMMA), polyamides, polyoxymethylene (POM), polyphenylether (PPE), polyurethanes (PUR), polyetheretherketone (PEEK), polyimides, polyarylsulfones (PSU, PPSU), polyphenylenesulfide PPS) or silicones such as polydimethylsiloxane (PDMS) could be used. The additive material which is mixed with the UHMWPE powder is preferably an antioxidant or a radical scavenger. It is preferable that during the mixing process of the additive and UHMWPE powder, a fully homogeneous mixture will be obtained. Clearly, if a homogeneous starting mixture is used, the additive material will be evenly distributed throughout the final UHMWPE preform.

Once the additive and UHMWPE powder have been mixed, they are moulded into the preform at a temperature which is above the melting point of the UHMWPE powder.

At this stage, the temperature is not especially crucial for the moulding step, suffice that it is above the melting point of the UHMWPE powder. Increased temperatures will lead to a more rapid moulding of the material into the preform, as is well known in the art.

Typically, the moulding of the additive material and UHMWPE powder, will be at a temperature which is above the melting point of the UHMWPE powder, but which is also preferably below the degradation temperature of the additive material. Clearly, temperature effects most compounds and indeed the same holds true for the antioxidant or radical scavengers of the additive material. It is preferable, although not necessary, to maintain the temperature of the moulding step below the degradation temperature of this additive material, as this leads to an improved final product. In one aspect of the present invention moulding of the UHMWPE powder is done in an inert atmosphere such as argon or nitrogen.

As is well known in the art, irradiation of the UHMWPE preform by gamma or electron beam radiation, will lead to an increase in the crosslink density between the individual UHMWPE polymers. An equivalent measure of the density of crosslinks of the material, is that of the molecular weight between the crosslinks. Clearly, the higher the crosslink density between the individual UHMWPE polymers, the lower the molecular weight between the crosslinks. Clearly, the inverse is also true, wherein a decrease in the crosslinking density is typified by an increase in the molecular weight between crosslinks. Preferably, the irradiation with the gamma or electron beam is at a dose of between 2 and 20 Mrad, which value can be chosen dependent upon the final properties of the UHMWPE material required. Changing the irradiation dose will lead to a difference in the molecular weight between crosslinks, and is intended to be chosen on the basis of the desired final product.

At this stage, an UHMWPE preform has been fabricated which has a decreased molecular weight between crosslinks. This decreased molecular weight is, as is well known in the art, indicative of a material possessed of improved wear characteristics. This increase in the number of crosslinks, leads to a more wear resistant final product, as the individual polymers are more substantially bound to those of its surroundings. As is well known in the art, however, the increase in the number of crosslinks of the UHMWPE material will tend to be accompanied by an increase in the formation of free radicals. This is a clear result of the gamma or electron beam radiation inducing the crosslinking reaction, and leading to the formation of the such.

The generation of free radicals within the UHMWPE preform material is generally undesirable. An increase in free radical content is usually accompanied by an increase in the oxidation of the UHMWPE material upon long term exposure to oxygen or under accelerated ageing conditions as described by ASTM F2003. This results from the free radicals present within the material reacting more readily with oxygen present in the environment of the preform, which will lead to an unwanted degradation in the end properties of the material.

In the past, UHMWPE components were packaged in air prior to the irradiation treatment. However, materials that were irradiated in air showed an increase in oxidation after artificial aging (Sutula et al., Clinical Orthopaedics and Related Research, 1995, 319, pp 29) or after real-time shelf aging (Edidin et al., 46$^{th}$ ORS Annual Meeting, 2000, 0001). This oxidation is accompanied by an undesirable reduction of mechanical properties (Edidin et al., 46$^{th}$ ORS Annual Meeting, 2000, 0001; Currier et al., Journal of Biomedical Materials Research, 2000, 53, pp 143). Later on, the sterilization step, as well as the crosslinking with higher irradiation doses, was carried out in inert gas or vacuum environment, which led to a reduction of the detrimental oxidation of UHMWPE (Edidin et al., 46$^{th}$ ORS Annual Meeting, 2000, 0001; Sutula et al., Clinical Orthopaedics and Related Research, 1995, 319, pp 29) but also to a more complex and expensive irradiation process.

By contrast, the material according to the current invention does not suffer from this increase in oxidation resulting from the gamma or electron beam radiation step. The presence of the additive material dramatically reduces the oxidation of the UHMWPE preform, despite its irradiation in air. Hence, the material according to the present invention exhibits very low oxidation combined with a facile and cheap irradiation procedure. Indeed, after a step of artificial ageing, as prescribed in ASTM F 2003 in an oxygen bomb at 5 atm oxygen pressure and 70° C. for fourteen days, the UHMWPE preform of the current invention shows an oxidation index which is at least the same, or more usually lower, than that of a typical gamma-sterilized (processed in an inert gas such as nitrogen or argon) standard UHMWPE sample material, in either bulk form, as a preform or after it has been formed into an implant.

A gamma-sterilized (inert gas, such as nitrogen or argon) standard UHMWPE sample is considered as being a standard sample for means of comparison in the present invention. This standard sample is prepared from the same UHMWPE powder as described above, but does not comprise an additive, and is not irradiated by a high dose of gamma or electron beam radiation but the dose level is restricted to 2.5-4.0 Mrad as described in the UHMWPE Handbook (Edited S. Kurtz, Elsevier Academic press, 2004, page 38). After consolidation of the UHMWPE powder by moulding at a temperature above its melting point, the material is sterilized by means of a dosage of gamma radiation. Typically, this sterilisation irradiation step is at a dose of around 3 Mrad. Also the UHMWPE sample can be packaged in an inert atmosphere prior to the gamma radiation, as described in the UHMWPE Handbook (Edited S. Kurtz, Elsevier Academic press, 2004, page 38). Such a sterilisation step is performed for samples which are intended for use as implants into the human body, wherein the samples must be sterilized prior to their use. Additionally, as is clear from the above, such a gamma-sterilized sample is usually formed into the required implant shape prior to the sterilisation step. This forming into the implant shape has no significant bearing on the relevant properties of the material, in particular with regards the oxidation index.

Before 1995, polyethylene was commonly sterilized by γ-irradiation in air-permeable packaging that permitted oxygen to contact the implants both during and after the irradiation process. This led to severe oxidation both on the shelf and in-vivo and as a result to early failure of implanted bearings (Currier et al., The Journal of Arthroplasty, 2007, 22(5), p. 721; Currier et al. Clinical Orthopaedics and Related Research, 1992, 342). Thereupon, as a consequence, UHMWPE used for artificial joint applications was γ-irradiated in barrier packagings, either evacuated by applying a vacuum or flushed with inert gas, which excluded oxygen. This led to a significant reduction of the oxidation during irradiation and on the shelf. However, since oxidation also occurs in the body, γ-barrier or γ-inert sterilized components only significantly delayed but did not completely inhibit the oxidation process (Currier et al., The Journal of Arthroplasty, 2007, 22(5), p. 721).

Looking at the comparative examples provided at the end of the specification, several examples of materials according to the current invention are shown. Additionally, the examples detail the properties of the material according to the present invention at the various stages of the formation process. In these comparative examples, samples are shown with no additive material, an additive of α-tocopherol, curcumin and naringenin. Each of these additive compounds can be considered as antioxidant material, and indeed are natural antioxidant materials which can be found either in the human body or in typical nutrition.

Looking at the data shown in example 4, and especially in Table 4 therein, a comparison of the molecular weight between crosslinks, $M_c$, of numerous samples with and without additive materials and at a variety of irradiation doses, are presented for comparison with the gamma-sterilized UHMWPE sample. As is immediately obvious, the step of irradiating the samples, as shown in Table 4 by a dose of 7 or 14 Mrad, leads to a substantial decrease in the molecular weight between crosslinks. Clearly, this decrease in molecular weight between crosslinks is a result of the irradiation and shows an increase in the crosslink density which is associated with an increase in the wear resistance. That is, the material according to the present invention is possessed of a significantly improved wear resistance over the standard gamma-sterilized sample (PE Steri). Whilst radiation doses of only 7 and 14 Mrad are shown in Table 4, it is quite clear that the same trend of an increase in the crosslink density will be seen for a wide range of irradiation doses, and following the general trend that an increase in the dosage leads to an increase in the density of crosslinks, a decrease in the molecular weight between crosslinks as a result and an increase in the wear properties of the final material. As such, it is clear from this example that the material according to the current invention is substantially more wear resistant than the standard UHMWPE material. In light of this improved wear, it is anticipated that such a material would be extremely resilient if utilised as an implant for the body, for example in total joint replacements for the knee, hip, shoulder, ankle, wrist, toe or fingers.

Turning to example 3, the same materials as shown in example 4 are shown with their maximum oxidation index after artificial ageing. This artificial ageing is performed as described above. Immediately evident, is that the gamma-sterilized UHMWPE sample has an maximum oxidation index which is comparable or indeed lower than a UHMWPE preform which has had a high dose gamma or electron beam irradiation step, but which is not provided with an additive material according to the current invention. That is, the samples PE 16 and PE 23 are treated in the same way as described above for the material of the current invention, but have not had an additive material incorporated prior to the moulding step. These materials are treated with the electron or gamma irradiation step, and the maximum oxidation index is shown in Table 3. Clearly, the samples which have been irradiated with 7 or 14 Mrad and possess no additives, will have increased wear characteristics, as can be seen in Table 4, but they also have an increased oxidation index as a result of the increased radiation dosage. As has been discussed above, this increased oxidation index is undesirable, as it means that the UHMWPE preform will oxidise more readily during storage or in use as an implant, which will lead to an embrittlement of the material and significant complications such as increased wear or fatigue failure of the implant.

Turning to the four samples in which an additive material is incorporated with the UHMWPE powder prior to moulding of the preform, the oxidation index after ageing is seen to be significantly reduced for the samples of α-tocopherol, curcumin and naringenin. In fact, at best the oxidation index after artificial ageing, is approximately five times lower than that of the gamma-sterilized sample. This is an extremely significant result, as it shows that the UHMWPE material according to the present invention, is possessed of both a significantly improved wear characteristic compared with the standard gamma-sterilized UHMWPE material, and furthermore a much better resistance to oxidation during storage or use. Both of these properties are of considerable advantage in the formation of implant parts: there is a clear improvement in the storage time of the implant parts prior to use, as well as an improvement in the oxidation characteristics whilst in use, coupling this with the improved wear characteristics while in use, will lead to a lengthening of the lifetime of the implant.

Numerous mechanical properties of the materials are shown in example 5, and are presented in Table 5 therein. As can be seen from this table, the yield stress, tensile strength, elongation at break and fracture toughness of materials according to the current invention, are compared with a standard material which is possessed of no additive. This example and results therein clearly show that the addition of the additive material in minor quantities does not have any significant detrimental effects to the final mechanical properties of the UHMWPE material with an additive. Not only, therefore, do the materials according to the present invention show an improvement in oxidation characteristics as compared with a material not comprising the additive, but the provision of the additive does not significantly affect the final mechanical properties. Again, this is of significant advantage when the material is to be used as an implant, as it shows that the material has maintained its integrity, and is still of use as an implant.

As can be seen in Table 5 of example 5, as well as Table 1 of example 1, the processing temperatures for the materials are either 170° C. or 210° C. These values are generally chosen such that they are above the UHMWPE melting point, thereby allowing the moulding of the powder into the preform, but below the degradation temperature of the pure additive material. These temperature values are shown purely by way of example, and are not intended in any way to limit the range of the temperatures which may be applied to the UHMWPE powder and additive material during moulding. Indeed, it is conceivable to use lower temperatures and an increased time at the moulding stage, or higher temperatures and a reduced time for fabricating the preform. Additionally, whilst it is desirable to maintain the temperature below the degradation temperature of the pure additive material, even applying a temperature above the degradation temperature during the moulding step will lead to significant improvements in the oxidation resistance of the UHMWPE with additive preform.

Further, the materials shown as additives in each of the 5 comparative examples, are also not intended as specific limitations as to the choice of materials. Indeed, it is quite possible to choose from a wide range of antioxidants or free radical scavenging materials. Preferably, these antioxidant materials are chosen such that they are not water soluble, not soluble in new born calf serum, are lipophilic, biocompatible and are generally natural antioxidants which are present in human nutrition. Additionally, materials that form the precursors of antioxidants and which can be converted by the human body into antioxidants are also considered as possible alternatives.

Appropriate materials which fall into the above categories, are materials chosen from the carotenoid family, or also the flavonoid group of materials. Examples of carotenoids are those of β-carotene and lycopene, and examples of flavonoids are naringenin, hesperitin and luteolin. Further compounds which are also appropriate as the additive material, are: propyl gallate, octyl gallate, dodecyl gallate, melatonin, eugenol and coenzym Q10. Whilst specific data is not presented in the comparative examples 1 to 5, the abovementioned compounds are all active antioxidants and are appropriate as choices for the additive material in the UHMWPE material of the present invention.

As can be seen from the above, the method of formation of the UHMWPE material according to the present invention, is suitable to provide a wear resistant UHMWPE material which is also possessed of excellent oxidation resistance. A further additional advantage of the current material and method of production, is that the improved oxidation characteristics of the material are achieved without performing a specific annealing step on the irradiated preform. That is, there is no necessity of annealing the irradiated preform material in order to improve the oxidation characteristics, as the additive material provides these desirable properties.

A further property of the material of the present invention, is that of the free radical content after irradiation. Example 2 shows in Table 2 the free radical content of the irradiated materials as an ESR signal. That is, the free radical content is measured by electron spin resonance of the material at room temperature and between one and four weeks after the irradiation step. Again, the materials are the same as those seen in examples 3 to 5, and are provided with the comparison with the gamma-sterilized sample. Immediately evident from the data in Table 2, is that the free radical content of the additive containing material, as judged by the ESR signal, is actually higher than that of the gamma-sterilized preform standard. As has been discussed above, the step of irradiating the samples will increase the crosslink density whilst also increasing the number of generated free radicals. In light of this, it is expected that the gamma-sterilized standard preform will not generate an excessive number of free radicals, as it has not had such a high dose of irradiation in order to form an increased number of crosslinks. It is particularly interesting to note that the free radical content of the material according to the present invention, whilst being higher than that of the gamma-sterilized standard UHMWPE preform, does not influence the oxidation characteristics of the material. That is, the ESR signal of the material according to the present invention is generally higher than that of the gamma-sterilized standard preform, whilst the oxidation index of such samples is lower than that of the gamma-sterilized standard material. Whilst it is well known in the art that an increased free radical content will lead to an increased oxidation of the UHMWPE material (The UHMWPE Handbook, Edited S. Kurtz, Elsevier Academic press, 2004, Chapter 11), this does not hold true for the material according to the present invention. This is clearly shown with comparison of Table 2 and 3 from examples 2 and 3.

Two possible mechanisms of how the material according to the present invention can have a higher resistance to oxidation whilst having a higher free radical content than that of the gamma-sterilized standard sample are presented:

The first possibility is that the additive material is actually providing an active binding site for the free radicals contained within the material. That is, the free radicals are still clearly present within the material according to the present invention, but are not able to participate in any oxidation reactions. This is supported by the high ESR signal and the low oxidation index value. It is quite clear, therefore, that the presence of the additive material is having a significant effect on the ability of the free radicals to react with oxygen which is present in the vicinity of the UHMWPE material. It is considered that the additive material is in some way binding the free radicals either to itself or within the polymer structure, such that the free radicals cannot react with any oxygen present, which leads to the significant improvement in the oxidation properties of the material.

A second possibility as to why the material according to the present invention has a low oxidation index in spite of a high free radical content, is the specific reaction of the additive material with oxygen present in the vicinity of the preform. In this scenario, the free radicals are still present within the UHMWPE material, but these are less reactive with the oxygen in the environment than the additive material itself. That is, the additive material of the antioxidant or free radical scavenger, is possessed of a higher reactivity with oxygen than the free radicals, and as a result reacts with the oxygen before the free radicals. This would explain why a high free radical content may be tolerated within the UHMWPE material of the current invention, whilst also providing the significantly improved oxidation characteristics. That is, oxidation of the UHMWPE material by reaction of the free radicals contained therein, simply does not happen as it is energetically more favourable to react with the additive material.

Whilst the above two scenarios are presented independently, it is also quite likely that both play a part in the properties of the present material. That is, the free radicals could be bound to some degree to the additive material, and additionally the additive material could be energetically more likely to react with the oxygen present in the environment of the sample.

Looking at the molecular weight between crosslinks of Table 4 in example 4, the values for the samples prepared according to the current invention have values lower than that of the gamma irradiated standard UHMWPE preform. Indeed, the material according to the present invention is expected to have a molecular weight between crosslinks after irradiation of the preform of between 10 and 60% lower than that of the gamma-sterilized standard UHMWPE preform. Clearly, these are advantageous values, as they show a material with significantly improved wear characteristics. Preferably, the molecular between crosslinks is below 6000 g/mol.

As is further evident from the data shown in Table 3 of example 3, and as discussed above, the material according to the present invention has a maximum oxidation index after artificial ageing which is below that of the gamma-sterilized UHMWPE sample. In fact, the material according to the present invention will have a maximum oxidation index after artificial ageing of between 5 and 75% that of the gamma-sterilized UHMWPE sample. That is, the material is expected to have an oxidation index after artificial ageing which is below 0.35.

As can be seen in Table 2 of Example 2, the ESR signal typifying the free radical content of the UHMWPE material according to the present invention, is higher than that of the gamma irradiated standard sample. It is expected, that the free radical content of the irradiated preform according to the current invention will lie between 110 and 700% that of the gamma-sterilized standard UHMWPE sample.

Whilst all of the comparative examples in 1 to 5 list the amount of additive as being 0.1% w/w, this is shown purely by way of example. It is anticipated, that an amount of additive material lying in the range of 0.001 to 0.5 weight % will provide an effective material according to the present invention. Preferably, the amount of additive material will lie in the range of 0.02 to 0.2 weight %. Such an amount of additive material, will give the desired improvement to the oxidation characteristics, without significantly weakening and degrading the mechanical properties of the highly crosslinked UHMWPE material.

As was discussed above, the comparative examples show only two doses for the irradiation, that of 7 and 14 Mrad. It is expected, that a dose between 2 and 20 Mrad of either gamma or electron beam radiation will be sufficient to give the improved crosslink density, for the improved wear characteristics of the final sample. It is preferable, that the dose applied in the irradiation step, lies within the range of about 4 and 15 Mrad, as this provides sufficient crosslinking without further sample damage.

As was discussed above, the material according to the present invention is considered as being appropriate for producing implant parts. As such, the irradiated preform can be further treated by shaping it into the relevant shape for the implant material. After the shaping of the implant, it is necessary to sterilise the material such that it can be stored and then readily used during an operation. In order to sterilise the implant part, the implant can be packaged in a gas barrier packaging using a protective atmosphere such as nitrogen or argon and sterilized with a further gamma irradiation step at between 2 and 4 Mrad. The implant can also be packaged in a gas permeable packaging and subsequently sterilized using either ethylene oxide or a gas plasma. Once such an implant has been packaged and sterilized, it can be stored safely until required during an operation. The significant advantage of the implants produced from a material according to the present invention, are that the oxidation of the material is significantly reduced over that of the standard UHMWPE material, which will allow for a substantially increased shelf life.

COMPARATIVE EXAMPLES

For all samples, the following products were used: GUR® 1020 medical grade UHMWPE (Ticona GmbH, Germany), (±)-α-tocopherol (Vitamin E, BioChemika, Sigma-Aldrich Chemie GmbH, Switzerland)., curcumin (from curcuma longa, powder, Sigma-Aldrich Chemie GmbH, Switzerland) and (±)-naringenin (Sigma-Aldrich Chemie GmbH, Switzerland).

Example 1

Samples were produced in a "semi-industrial" size, 225× 225×45 mm$^3$. UHMWPE GUR® 1020 was processed without additives and with the addition of a-tocopherol, curcumin and naringenin, respectively. Subsequently, the samples were crosslinked by means of γ-irradiation in air (ambient atmosphere condition where oxygen is present) at room temperature with or without a packaging but preferably without packaging with two different doses, 7 and 14 Mrad±10%, respectively. No thermal post-treatment was performed. As a reference, non-irradiated materials (0 Mrad) were used. Processing procedures of the samples of example 1 are listed in Table 1:

TABLE 1

Processing procedures of samples of example 1.

| Sample | Additive | Amount [% w/w] | Processing Temperature [° C.] | γ Dose [Mrad] |
|---|---|---|---|---|
| PE 30 | none | — | 170 | 0 |
| PE 33 | α-tocopherol | 0.1 | 210 | 0 |
| PE 32 | curcumin | 0.1 | 170 | 0 |
| PE 46 | naringenin | 0.1 | 170 | 0 |
| PE 16 | none | — | 170 | 7 |
| PE A | α-tocopherol | 0.1 | 210 | 7 |
| PE 19 | curcumin | 0.1 | 170 | 7 |
| PE 20 | naringenin | 0.1 | 170 | 7 |
| PE 23 | none | — | 210 | 14 |
| PE B | α-tocopherol | 0.1 | 210 | 14 |
| PE 26 | curcumin | 0.1 | 170 | 14 |
| PE 27 | naringenin | 0.1 | 170 | 14 |

This experiment shows that it is possible to obtain completely homogeneous samples in "semi-industrial" sizes by the mixture of UHMWPE powder with several different antioxidants. Moreover, this example shows that it is possible to do the processing of the mixtures at the relatively low temperature of 170° C., which is 35° C. above the melting temperature of UHMWPE.

Example 2

The free radical content of all irradiated samples of example 1 was determined. Determination of the free radical content was carried out by means of electron spin resonance (ESR) at room temperature 1-4 weeks after γ-irradiation. The ESR signal was measured on cylinders cut from the centre of the samples (length 15 mm, diameter 4 mm). These cylinders were inserted in a test tube which was positioned in the ESR apparatus (Bruker). The magnetic field was varied at a constant microwave frequency to obtain the absorption signal (first derivative) as a function of the magnetic field strength. The final ESR signal in arbitrary units [a.u.] is obtained by double integration of the primary absorption signal (Gerson F., Huber W., Electron Spin Resonance Spectroscopy of organic radicals, Wiley VCH, 2007; Weil J. A., Bolton J. R. Electron Paramagnetic Resonance, John Wiley&Sons, 2007). The ESR signal in percentages was derived from the value after double integration. The results are shown in Table 2:

TABLE 2

ESR signal of samples of example 2.

| Sample | Additive | Amount [% w/w] | γDose [Mrad] | ESR Signal [a.u.] | ESR Signal [%] |
|---|---|---|---|---|---|
| PE 16 | none | — | 7 | 4.96 | 100 |
| PE A | α-tocopherol | 0.1 | 7 | 1.30 | 26.2 |
| PE 19 | curcumin | 0.1 | 7 | 5.25 | 105.8 |
| PE 20 | naringenin | 0.1 | 7 | 5.55 | 111.9 |
| PE 23 | none | — | 14 | 9.65 | 100 |
| PE B | α-tocopherol | 0.1 | 14 | 6.37 | 66.0 |
| PE 26 | curcumin | 0.1 | 14 | 10.30 | 106.7 |
| PE 27 | naringenin | 0.1 | 14 | 8.74 | 90.56 |
| PE steri (inert gas) | none | — | 3 | 3.62 | 55 |

Example 2 demonstrates that the addition of α-tocopherol to UHMWPE reduces the number of free radicals after crosslinking, whereas curcumin enhances the free radical count. The influence of naringenin on the number of free radicals in sintered and crosslinked UHMWPE products seems to be only moderate. PE steri shows the data relating to the gamma-sterilized UHMWPE standard sample.

Example 3

With the same set of samples as in example 2, the influence of curcumin and naringenin on the oxidative stability of UHMWPE compounds was examined. All samples were accelerated aged according to ASTM F 2003 in an oxygen bomb at 5 atm oxygen pressure and 70° C. for 14 days. Oxidation indices of the aged components were determined by means of FTIR according to ASTM F 2102-06. The method for making measurements of the oxidation index according to this standard is as follows: 150 μm thick slices of the sample are made and tested to give a depth profile for the oxidation index. From the micro-slices taken of the sample the infrared spectrum is taken by means of FTIR with a resolution of 4 cm$^{-1}$. The oxidation index is defined as the intensity of the peaks in the region 1680-1765 cm$^{-1}$, which is associated with carbonyl peaks, divided by the intensity in a reference band which lies between 1330 and 1396 cm$^{-1}$.

Maximum oxidation indices after ageing (max. OI) are displayed in Table 3.

TABLE 3

Maximum oxidation indices after artificial ageing of sample of example 3.

| Sample | Additive | Amount [% w/w] | γ Dose [Mrad] | Max. OI after ageing |
|---|---|---|---|---|
| PE 16 | none | — | 7 | 0.35 |
| PE A | α-tocopherol | 0.1 | 7 | 0.07 |
| PE 19 | curcumin | 0.1 | 7 | 0.08 |
| PE 20 | naringenin | 0.1 | 7 | 0.08 |
| PE 23 | none | — | 14 | 0.55 |
| PE B | α-tocopherol | 0.1 | 14 | 0.11 |
| PE 26 | curcumin | 0.1 | 14 | 0.11 |
| PE 27 | naringenin | 0.1 | 14 | 0.11 |
| PE steri (inert gas) | none | — | 3 | 0.41 |

This example demonstrates that samples without any post-irradiation thermal treatment and which contain curcumin (PE 19, PE 26) or naringenin (PE 20, PE 27) show minimal or no oxidation after artificial ageing compared to irradiated pure UHWMPE material (PE 6, PE 23). Irradiated samples containing curcumin or naringenin contain equal or more free radicals than the material without any additive (see Table 2) but nevertheless almost no oxidation is observed after artificial ageing. Conclusion: It is possible to obtain very low oxidation indices after artificial ageing with UHMWPE samples starting with a high number of free radicals before the ageing procedure.

Example 4

With the same set of samples as in the previous examples, crosslink densities and swell ratios were determined according to ASTM D 2765-95 Method C (3 test specimens per sample). Results are listed, represented by the molecular weight between crosslinks, $M_c$, in Table 4.

Additionally, trans-vinylene indices (TVI) were determined by means of FTIR by normalizing the area of the trans-vinylene peak (965 cm$^{-1}$) with the area of a reference peak (1900 cm$^{-1}$). Four microtome sections were measured to a maximum depth of 2.5 mm and averaged to obtain qualitative information on the actual gamma dose (gamma dose in relation to other samples).

TABLE 4

Molecular weight between crosslinks of samples of example 4

| Sample | Additive | Amount [%] | γ Dose [Mrad] | Swell Ratio volumetric [—] | $M_c$ [g/mol] | TVI Index |
|---|---|---|---|---|---|---|
| PE 16 | none | — | 7 | 3.30 | 5433 | 0.080 |
| PE A | α-tocopherol | 0.1 | 7 | 3.48 | 5996 | 0.113 |
| PE 19 | curcumin | 0.1 | 7 | 3.41 | 5767 | 0.111 |
| PE 20 | naringenin | 0.1 | 7 | 3.41 | 5789 | 0.105 |
| PE 23 | none | — | 14 | 2.67 | 3518 | 0.162 |
| PE B | α-tocopherol | 0.1 | 14 | 2.82 | 3981 | 0.195 |
| PE 26 | curcumin | 0.1 | 14 | 2.82 | 3971 | 0.193 |
| PE 27 | naringenin | 0.1 | 14 | 2.69 | 3600 | 0.179 |
| PE steri (inert gas) | none | — | 3 | 3.77 | 6926 | 0.039 |

Experiment 4 clearly demonstrates that all additives consume radiation during the crosslinking process, leading to reduced crosslink densities compared to the pure UHMWPE sample (PE 16). Considering $M_c$ in relation to the corresponding TVI indices, curcumin seems to be a slightly and naringenin a perspicuously more efficient crosslinking additive compared with α-tocopherol. However, all samples containing antioxidants irradiated with a dose of 7 Mrad show lower molecular weights between crosslinks than a standard sterilized UHMWPE sample.

Example 5

Mechanical properties of several samples of example 1 were measured. Yield stress, tensile strength and elongation at break were determined according to ASTM D 638 (5 test specimens per sample), fracture toughness according to DIN EN ISO 11542-2 (4 test specimens per sample). The results of the mechanical testings are listed in Table 5:

TABLE 5

Mechanical properties of samples of example 5.

| Sample | Additive | Amount [% w/w] | Processing Temperature [° C.] | γ Dose [Mrad] | Yield Stress [MPa] | Tensile Strength [MPa] | Elongation at Break [%] | Fracture Toughness [kJ/m$^2$] |
|---|---|---|---|---|---|---|---|---|
| PE 30 | none | — | 170 | 0 | 22.5 ± 0.3 | 41.6 ± 3.0 | 470.8 ± 26.4 | 216 ± 13.6 |
| PE 33 | α-tocoph. | 0.1 | 210 | 0 | 24.0 ± 0.2 | 40.1 ± 2.6 | 457.3 ± 26.7 | 232.6 ± 5.9 |
| PE 32 | curcumin | 0.1 | 170 | 0 | 22.1 ± 0.2 | 38.0 ± 1.1 | 445.2 ± 21.8 | 208.4 ± 9.7 |
| PE 16 | none | — | 170 | 7 | 23.8 ± 0.6 | 43.7 ± 1.9 | 367.7 ± 15.9 | 108.7 ± 1.1 |
| PE A | α-tocoph. | 0.1 | 210 | 7 | 24.6 ± 0.2 | 40.9 ± 5.7 | 403.6 ± 50.0 | 144.3 ± 4.4 |
| PE 19 | curcumin | 0.1 | 170 | 7 | 23.2 ± 0.4 | 39.9 ± 2.6 | 378.0 ± 12.8 | 131.0 ± 3.6 |
| PE 20 | naringenin | 0.1 | 170 | 7 | 25.4 ± 0.4 | 42.6 ± 2.6 | 359.6 ± 22.3 | 144.3 ± 4.4 |
| PE 46 | naringenin | 0.1 | 170 | 0 | 24.1 ± 0.4 | 43.1 ± 3.0 | 484.7 ± 37.1 | 247.3 ± 4.4 |

This example shows that materials can be processed at 170° C. with excellent mechanical properties. Furthermore example 5 demonstrates that the addition of curcumin or naringenin does not negatively affect the mechanical properties of sintered UHMWPE products. All non-irradiated samples meet the standard ISO 5834-2 type 1 (YS>21.0 MPa, TS>35.0 MPa, EAB>300.0%, FT>180 kJ/m$^2$), although the temperature of the mould did not exceed 170° C. during processing. All crosslinked samples meet the standard ISO 5834-2 type 2 (YS>19.0 MPa, TS>27.0 MPa, EAB>300.0%, FT>90 kJ/m$^2$).

The invention claimed is:
1. A method for fabricating an oxidation resistant UHMWPE material comprising:

mixing a quantity of an additive material, comprising at least an antioxidant or a radical scavenger with a UHMWPE powder;

moulding the mixture of UHMWPE powder and additive material to create a preform by applying a temperature above the melting point of the UHMWPE powder; and irradiating the preform in air under ambient atmospheric conditions with radiation comprising at least gamma or electron beam radiation at a dose of between about 2 and about 20 MRad;

wherein the irradiated preform with the additive material has a free radical content which is greater than the gamma-sterilized standard UHMWPE material without the additive material and has an oxidation index after artificial ageing that is the same or lower than that of gamma-sterilized standard UHMWPE material without the additive material; and wherein the additive material comprises at least one of a flavonoid and an amino acid based compound, and wherein the flavonoid is selected from the group consisting of naringenin, hesperitin and luteolin, and the amino acid based compound is selected from the group consisting of cvstein, glutathione, tyrosine and tryptophan.

2. The method according to claim 1, wherein the irradiation step of the preform increases the crosslinking in the preform such that the irradiated material has a molecular weight between crosslinks that is lower than that of the gamma-sterilized standard UHMWPE material without the additive material.

3. The method according to claim 2, wherein the molecular weight between crosslinks of the irradiated preform is about 10% to about 60% lower than that of the gamma-sterilized standard UHMWPE material without the additive material.

4. The method according to claim 1,
wherein the temperature applied to the mixture of additive and UHMWPE powder is above the melting point of the UHMWPE and below the degradation temperature of the additive material.

5. The method according to claim 1, wherein the amount of additive material mixed with the UHMWPE powder is in the range of about 0.001 to about 0.5 wt %.

6. The method according to claim 1, wherein the amount of additive material mixed with the UHMWPE powder is in the range of about 0.02% to about 0.2 wt %.

7. The method according to claim 1 wherein the radiation is at a dose of about 4 to about 15 Mrad.

8. The method according to claim 1, wherein the maximum oxidation index of the irradiated preform after artificial ageing is below that of the gamma-sterilized standard UHMWPE material without the additive material.

9. The method according to claim 1, wherein the maximum oxidation index of the irradiated preform after artificial ageing is between about 5% and about 75% of the gamma-sterilized standard UHMWPE material without the additive material.

10. The method according to claim 1, wherein the maximum oxidation index of the irradiated preform after artificial ageing is between about 10% and about 50% of the gamma-sterilized standard UHMWPE material without the additive material.

11. The method according to claim 1, wherein the maximum oxidation index of the irradiated preform after artificial ageing is between about 15% and about 30% of the gamma-sterilized standard UHMWPE material without the additive material.

12. The method according to claim 1, wherein the free radical content is measured by ESR, and the free radical content of the irradiated preform is higher than that of the gamma-sterilized standard UHMWPE material without the additive material.

13. The method according to claim 1, wherein the free radical content is measured by ESR, and the free radical content of the irradiated preform is about 110% and about 700% that of the gamma-sterilized standard UHMWPE material without the additive material.

14. The method according to claim 1, wherein the free radical content is measured by ESR, and the free radical content of the irradiated preform is about 120% and about 600% that of the gamma-sterilized standard UHMWPE perform without the additive material.

15. The method according to claim 1, wherein the free radical content is measured by ESR, and the free radical content of the irradiated preform is about 130% and about 500% that of the gamma-sterilized standard UHMWPE material without the additive material.

16. The method according to claim 1, further comprising shaping the irradiated perform into a shaped implant packaging the shaped implant sterilizing the shaped implant, wherein the sterilizing comprises at least one of gamma irradiating the implant at between about 2 and about 4 Mrad, and sterilizing the implant by exposing it to ethylene oxide or a gas plasma in a manner sufficient to sterilize the shaped, packaged implant.

17. The method according to claim 4, wherein the temperature applied to the mixture of additive and UHMWPE powder is from about 170° C. to about 210° C.

18. A method for fabricating an oxidation resistant UHMWPE material comprising:
mixing a quantity of an additive material, comprising at least an antioxidant or a radical scavenger with a UHMWPE powder;

moulding the mixture of UHMWPE powder and additive material to create a preform by applying a temperature above the melting point of the UHMWPE powder: and irradiating the preform in air under ambient atmospheric conditions with radiation comprising at least gamma or electron beam radiation at a dose of between about 2 and about 20 MRad;

wherein the irradiated preform with the additive material has an oxidation index after artificial ageing that is the same or lower than that of gamma-sterilized standard UHMWPE material without the additive material; and wherein the additive material comprises at least one of a flavonoid and an amino acid based compound, and wherein the flavonoid is selected from the group consisting of naringenin, hesperitin and luteolin, and the amino acid based compound is selected from the group consisting of cystein, glutathione, tyrosine and tryptophan.

19. A method for fabricating an oxidation resistant UHMWPE material comprising:
mixing a quantity of an additive material, comprising at least an antioxidant or a radical scavenger with a UHMWPE powder;

moulding the mixture of UHMWPE powder and additive material to create a preform by applying a temperature above the melting point of the UHMWPE powder; and irradiating the preform in air under ambient atmospheric conditions with radiation comprising at least gamma or electron beam radiation at a dose of between about 2 and about 20 Mrad;

wherein the irradiated preform with the additive material has an oxidation index after artificial ageing that is the same or lower than that of gamma-sterilized standard UHMWPE material without the additive material; and wherein the additive material comprises naringenin.

* * * * *